(12) United States Patent
Yeom

(10) Patent No.: US 10,866,618 B2
(45) Date of Patent: Dec. 15, 2020

(54) FLEXIBLE DISPLAY APPARATUS

(71) Applicant: LG Display Co., Ltd., Seoul (KR)

(72) Inventor: MoonSoo Yeom, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/665,776

(22) Filed: Oct. 28, 2019

(65) Prior Publication Data
US 2020/0166970 A1  May 28, 2020

(30) Foreign Application Priority Data

Nov. 28, 2018  (KR) .................. 10-2018-0149961

(51) Int. Cl.
*G06F 1/16* (2006.01)
*H04M 1/02* (2006.01)

(52) U.S. Cl.
CPC .......... *G06F 1/1652* (2013.01); *G06F 1/1618* (2013.01); *H04M 1/0268* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,733,744 B2* | 8/2017 | Lee | ................... | G06F 3/0412 |
| 9,823,699 B2* | 11/2017 | Ko | ................... | G06F 1/1626 |
| 10,063,677 B2* | 8/2018 | Cavallaro | ........... | H04M 1/0268 |
| 10,082,827 B2* | 9/2018 | Yamauchi | ............. | G06F 1/1626 |
| 10,104,790 B2* | 10/2018 | Lee | ................... | E05D 11/0054 |
| 10,334,750 B2* | 6/2019 | Koo | ................... | H05K 7/18 |
| 10,342,121 B2* | 7/2019 | Koo | ................... | G09F 9/301 |
| 10,367,164 B2* | 7/2019 | Ahn | ................... | H01L 51/5237 |
| 10,485,116 B2* | 11/2019 | Kim | ................... | G06F 1/1656 |
| 10,490,771 B2* | 11/2019 | Kim | ................... | H01L 51/524 |
| 10,551,880 B1* | 2/2020 | Ai | ................... | H04M 1/0216 |
| 10,558,242 B2* | 2/2020 | Kim | ................... | G09F 9/301 |
| 10,571,961 B2* | 2/2020 | Lee | ................... | G06F 1/1641 |
| 2015/0220117 A1* | 8/2015 | Lee | ................... | G06F 1/1652 |
| | | | | 361/749 |
| 2017/0374749 A1* | 12/2017 | Lee | ................... | H05K 5/0086 |
| 2019/0132947 A1* | 5/2019 | Koo | ................... | G02F 1/133305 |
| 2019/0132987 A1* | 5/2019 | Koo | ................... | H04M 1/0214 |
| 2019/0187752 A1* | 6/2019 | Lee | ................... | G06F 1/1679 |
| 2019/0200466 A1* | 6/2019 | Kim | ................... | H05K 5/0017 |

\* cited by examiner

*Primary Examiner* — Lisa Lea-Edmonds
(74) *Attorney, Agent, or Firm* — Fenwick & West LLP

(57) ABSTRACT

A flexible display apparatus is disclosed. The flexible display apparatus may include a flexible display panel including a display area and a non-display area and a backplate structure on the flexible display panel and configured to support the flexible display panel. The backplate structure includes an elastic structure and a rigid structure that is less flexible than the elastic structure.

19 Claims, 9 Drawing Sheets

FLEXIBLE DISPLAY APPARATUS

CROSS-REFERENCE TO RELATED APPLICATIONS

This application claims the priority to the Republic of Korea Patent Application No. 10-2018-0149961 filed on Nov. 28, 2018, in the Korean Intellectual Property Office, the disclosure of which is incorporated by reference in its entirety.

TECHNICAL FIELD

The present disclosure relates to a flexible display apparatus, and more particularly, to a flexible display apparatus including a backplate having improved stretchability.

BACKGROUND

A display apparatus used for a monitor of a computer, a TV, or a mobile phone includes an electroluminescence display apparatus that emits light by itself and a liquid crystal display (LCD) that requires a separate light source.

The electroluminescence display apparatus may include an organic light emitting diode, an inorganic light emitting diode, a quantum-dot diode, a perovskite LED, a micro LED, and the like.

Display apparatuses have been widely used not only in monitors of computers and televisions but also in personal portable devices. Research on display apparatuses having a wide display area and reduced volume and weight is underway.

In recent years, a flexible display apparatus capable of displaying an image even when a display area, a wiring, or the like is formed on a flexible substrate such as a plastic, which is a flexible material, and is folded or rolled is attracting attention as a next generation display apparatus.

SUMMARY

An embodiment of the present disclosure is related to a display apparatus including a backplate composed of stretchable resin and an island-shaped metal pattern to improve the flexibility and stretchability of the flexible display apparatus.

Objects of the present disclosure are not limited thereto, and objects, features, effects of the present disclosure, can be clearly understood by those skilled in the art from the following description.

A flexible display apparatus according to an embodiment of the present disclosure may include a flexible display panel including a display area and a non-display area; and a backplate structure on the flexible display panel such that the backplate structure overlaps at least the display area, the backplate structure including an elastic structure and a rigid structure disposed in the elastic structure, the elastic structure more flexible than the rigid structure.

A flexible display apparatus according to an embodiment of the present disclosure may include a flexible display panel including a plurality of pixels, each of the plurality of pixels comprising an electroluminescence element; an elastic structure disposed on a back surface of the flexible display panel; and a plurality of patterns disposed in the elastic structure, the plurality of patterns having a length along a first direction; and wherein the plurality of patterns is more rigid than the elastic structure.

A flexible display apparatus according to an embodiment of the present disclosure may include a flexible display panel configured to display an image; and a backplate structure on a rear surface of the flexible display panel, the backplate structure including a rigid structure and an elastic structure, the elastic structure having a plurality of openings and the rigid structure disposed within the plurality of openings; wherein the elastic structure is more flexible than the rigid structure.

The details of the embodiments of the present disclosure are included in the detailed description and drawings.

The present disclosure can provide a backplate structure made of stretchable resin and island-shaped metal patterns, thereby improving the flexibility and stretchability of the flexible display apparatus while supporting the flexible display apparatus.

The effects according to the present disclosure are not limited by the contents exemplified above, and more various effects are included in the present disclosure.

DETAILED DESCRIPTION

Figure 1:
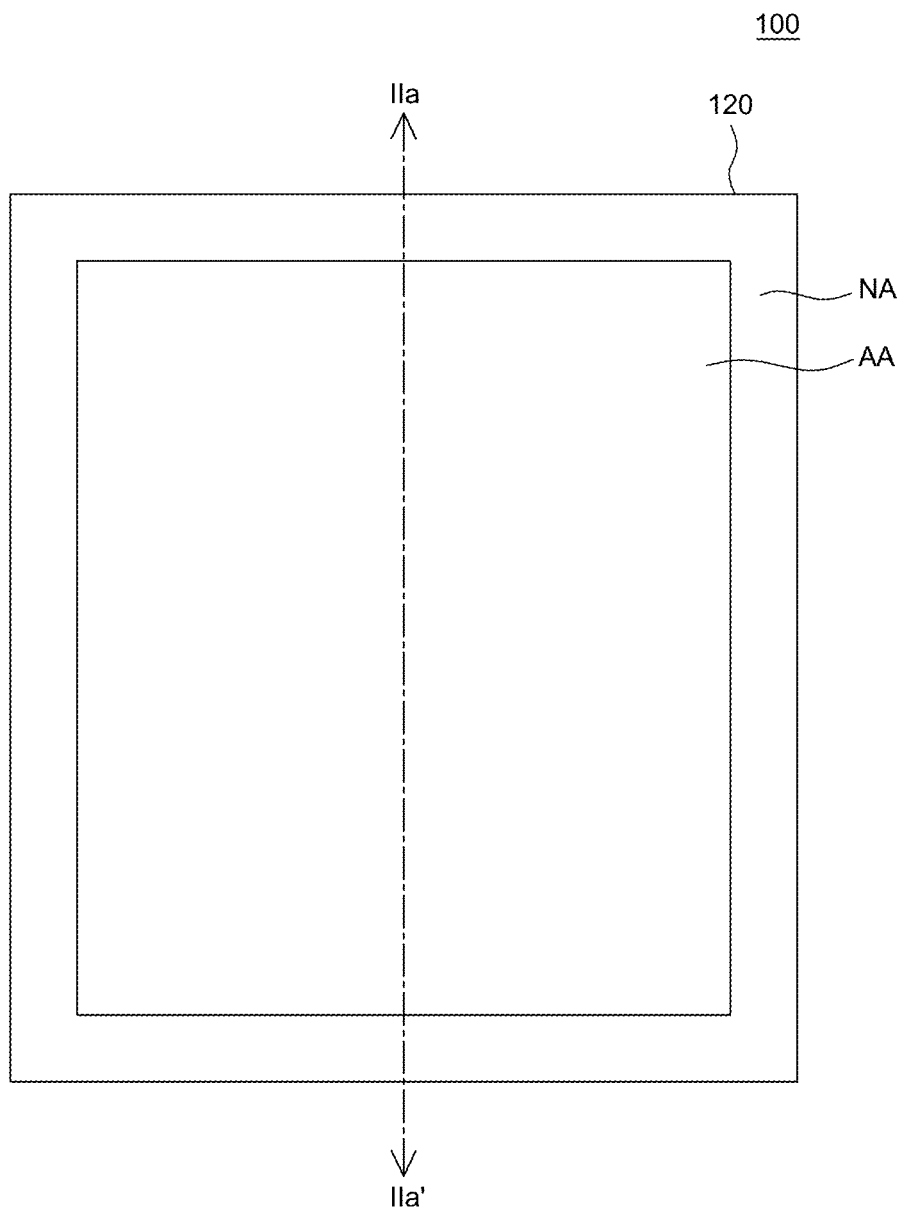
FIG. 1 is a plan view of a display apparatus according to an embodiment of the present disclosure as viewed from the front side.

Advantages and characteristics of the present disclosure and a method of achieving the advantages and characteristics will be clear by referring to the embodiments described below in detail together with the accompanying drawings. However, the present disclosure is not limited to the embodiment disclosed herein but will be implemented in various forms. The embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the various embodiments of the present disclosure are merely examples, and the present disclosure is not limited thereto.

Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other elements to be added unless the terms are used with the term "only". Any references to singular may include plural unless expressly stated otherwise.

Elements are interpreted to include an ordinary error range (e.g., a tolerance range) even if not expressly stated.

When the position relation between two elements is described using the terms such as "on", "above", "under", and "next", one or more elements may be positioned between the two elements unless the terms are used with the term "immediately" or "directly".

When an element or a layer is "on" another element or another layer, it may be interpreted as such the other layer or the other element can be interposed on or in the middle of another element or another layer.

Although the terms "first," "second," and the like are used for describing various elements, these elements are not confined by these terms. These terms are merely used for distinguishing one element from the other elements. Therefore, a first element to be mentioned below may be a second element in a technical concept of the present disclosure.

Like reference numerals refer to like elements throughout the specification.

Area and thickness of each element shown in the figures are merely for illustrative purpose for convenience of description, but are not necessarily limited to the area and thickness of the configuration of the present disclosure as illustrated.

Each of the features of the various embodiments of the present disclosure can be combined or combined with each other partly or entirely. The features of the various embodiments can be technically interlocked and driven as well. The features of the various embodiments can be practiced independently or in conjunction with each other.

Hereinafter, various embodiments of the present disclosure will be described in detail with reference to accompanying drawings.

The flexible display apparatus 100 according to an embodiment of the present disclosure can display an image even when folded or rolled. The flexible display apparatus 100 according to an embodiment of the present disclosure can have better flexibility as compared with a conventional display device.

Figure 2:
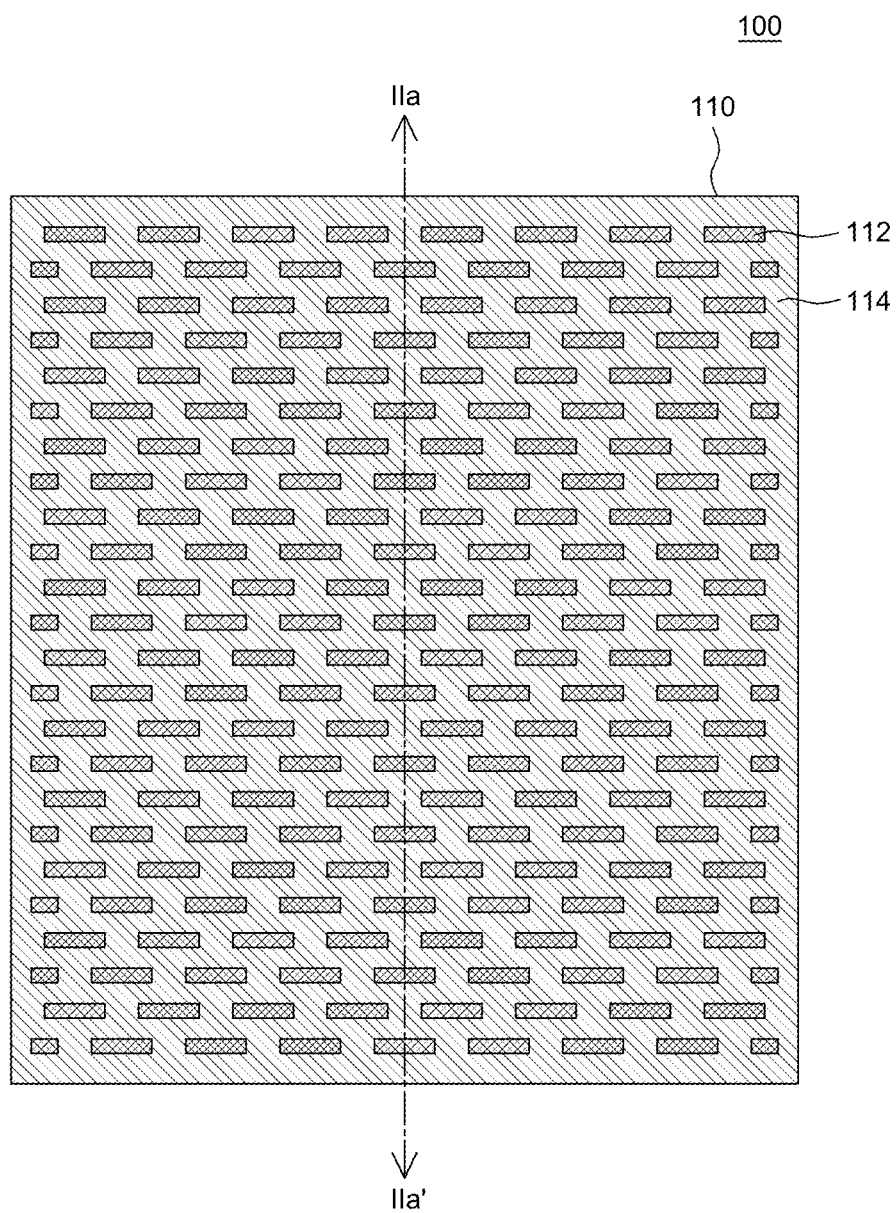
FIG. 2 is a plan view showing a display apparatus according to an embodiment of the present disclosure, viewed from the back side.
Figure 3:
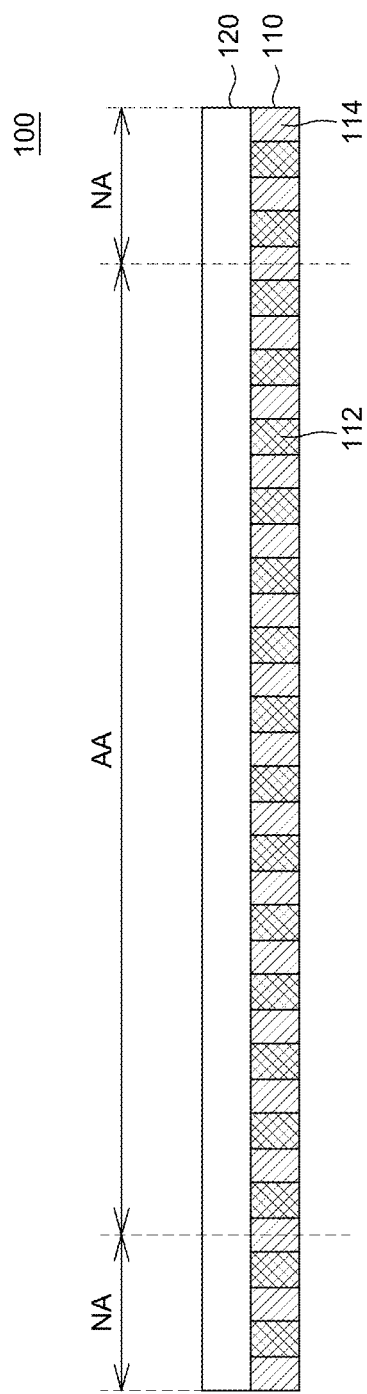
FIG. 3 is a cross-sectional view taken along line IIa-IIa' of FIG. 1 according to an embodiment of the present disclosure.

FIG. 1 is a plan view of a display apparatus according to an embodiment of the present disclosure as viewed from the front side. FIG. 2 is a plan view showing a display apparatus according to an embodiment of the present disclosure, viewed from the back side. FIG. 3 is a cross-sectional view taken along line IIa-IIa' of FIG. 1.

Referring to FIGS. 1 to 3, the flexible display apparatus 100 according to an embodiment of the present disclosure may include a backplate structure 110 and a flexible display panel 120.

The flexible display panel 120 is an image display panel configured to display an image to a user. The flexible display panel 120 includes a display area AA and a non-display area NA.

The display area AA is an area in which the image is displayed on the flexible display panel 120. The display area AA may be provided with a plurality of pixels and a circuit unit for driving the plurality of pixels. The plurality of pixels may be a basic unit constituting the display area AA.

For example, when the flexible display panel 120 is an electroluminescence display panel, the plurality of pixels may include an electroluminescence element including an anode, an electroluminescence layer, and a cathode. The anode can supply holes to the electroluminescence layer and may be made of a conductive material having a high work function. The electroluminescence layer receives holes from the anode and receives electrons from the cathode to emit light. The electroluminescence layer may include a red light emitting layer, a green light emitting layer, a blue light emitting layer, and a white light emitting layer depending on the color of light emitted from the electroluminescence layer. The cathode can supply electrons to the electroluminescence layer and can be made of a conductive material having a low work function. Further, a circuit unit for driving the electroluminescence element can be disposed. The circuit unit is configured to include a thin film transistor, a storage capacitor, a gate wiring, a data wiring, a power wiring, and the like, but each element can be variously modified according to the design of the flexible display apparatus 100.

For example, when the flexible display panel 120 is a liquid crystal display panel, the pixel may be a liquid crystal pixel. That is, the plurality of pixels is not limited to the electroluminescence element including the anode, the electroluminescence layer, and the cathode. The circuit unit for driving the plurality of pixels may be, for example, a thin film transistor, a storage capacitor, a gate wiring, a data wiring, and the like, but the present disclosure is not limited thereto.

Hereinafter, it is assumed that the flexible display panel 120 is an electroluminescence display panel, but the flexible display panel 120 is not limited to the electroluminescence display panel.

The non-display area NA is an area where an image is not displayed. In the non-display area NA, various wirings and circuit units for driving a plurality of pixels in the display area AA are arranged. For example, a non-display area NA may be provided with a drive IC or the like such as a gate wiring driver IC or a data wiring driver IC for transmitting signals to a plurality of pixels and circuit units of the display area AA, but the present disclosure is not limited thereto.

The flexible display panel 120 may include a flexible substrate. The flexible substrate is a base member for supporting various configurations of the flexible display panel 120, and may be formed of an insulating material. The flexible substrate may be made of a plastic material such as, for example, polyimide (PI) or the like. A plurality of pixels for displaying an image of the display area AA may be formed on the flexible substrate.

On the other hand, the flexible display panel 120 may be configured as top emission type or bottom emission type according to an emission direction in which light emitted from the electroluminescence element. The top emission type is a type in which light is emitted in an upward direction of the flexible substrate. That is, in order to emit light upward the cathode side, a reflective layer may be formed under the anode. The bottom emission type emits light in a downward direction of the flexible substrate. The anode may be made of a transparent conductive material only, and the cathode may be made of a metal material having a high reflectance.

The flexible display panel 120 may include an encapsulation unit configured to protect the display area AA. The encapsulation unit seals a plurality of pixels in the display area AA. The encapsulation unit can protect a plurality of pixels of the display area AA from moisture, oxygen, shock, and the like from outside. The encapsulation unit may be formed by alternately stacking a plurality of inorganic layers and a plurality of organic layers. For example, the inorganic layer may be made of an inorganic material such as silicon nitride (SiNx), silicon oxide (SiOx), aluminum oxide (AlOx), and the like and the organic layer may be made of an epoxy-based polymer or acrylic-based polymer, but the present disclosure is not limited thereto.

An adhesive layer may be disposed between the backplate structure 110 and the flexible display panel 120. The adhesive layer can adhere the flexible display panel 120 and the backplate structure 110 to each other. The adhesive layer is made of a material having adhesiveness and can be a thermosetting or natural curing adhesive. For example, the adhesive layer may be made of OCA (Optical Clear Adhesive), PSA (Pressure Sensitive Adhesive) or the like, but the present disclosure is not limited thereto.

The backplate structure 110 is disposed on the back surface (e.g., the rear surface) of the flexible display panel 120 to support the flexible display panel 120. The backplate structure 110 may be fixed to the flexible display panel 120 by an adhesive layer. The backplate structure 110 may protect the flexible display panel 120. The backplate structure 110 is configured to have stretchability and flexibility.

The backplate structure 110 is configured to include an elastic structure 114 and a rigid structure 112.

The elastic structure 114 is configured to hold the rigid structure 112. The elastic structure 114 is configured to secure each rigid structure 112 patterned in an island shape. The elastic structure 114 may be a mesh pattern. The elastic structure 114 is made of a material having viscoelasticity. The elastic structure 114 may be formed by a screen printing method. The elastic structure 114 may be formed by applying a resin having viscoelastic properties and then curing the resin. The elastic structure 114 may be made of various resin materials, for example, the elastic structure 114 may be made of a material such as epoxy, acrylic, rubber, silicon, soft sealant, and the like. However, the present disclosure is not limited thereto. For example, the Young's modulus of elastic structure 114 may be between $10^4$ Pa and $10^6$ Pa. However, the present disclosure is not limited thereto.

The rigid structure 112 may be made of a metal material such as aluminum, SUS (Steel Use Stainless) or a nickel-iron alloy (e.g., Invar), or a material such as plastic. However, the material of the rigid structure 112 may be variously changed, but the present disclosure is not limited thereto, as long as it satisfies the physical conditions such as the amount of thermal deformation, the radius of curvature, and the rigidity according to the design. In one embodiment, the elastic structure 113 is more flexible than the rigid structure 112. In other words, the rigid structure 112 is more rigid than the elastic structure 113.

The rigid structure 112 may be a structure in which a plurality of island patterns are arranged at specific intervals. Each island pattern may be configured to have the same or different shape from each other. Each island pattern may have a major axis in the first direction and a minor axis in the second direction perpendicular to the first direction. On the other hand, it may have a minor axis in the first direction and a major axis in the second direction. That is, the rigid structure 112 may include a plurality of island patterns spaced apart from each other. The rigidity of the flexible display apparatus 100 can be increased along the major axis direction of the island pattern and the flexibility can be increased along the minor axis direction.

The shape of a portion of the plurality of island patterns may be a first shape and the shape of another part may be a second shape different from the first shape.

The plurality of island patterns may be configured to have a major axis, i.e., a long axis and a minor axis, i.e., a short axis. The flexible display apparatus 100 along the long axis of the island pattern can be configured to have rigidity. The flexible display apparatus 100 may be configured to have flexibility in accordance with the shortening of the island pattern. The long axis and the short axis may be perpendicular to each other, for example, the long axis may be the first direction and the short axis may be the second direction.

Each of the plurality of island patterns may be formed of at least one shape among a point shape, a rod shape, an elliptical shape, a ribbon shape, a dumbbell shape, a round shape, a rectangular shape, a rhombic shape, and a polygonal shape.

The thickness of the elastic structure 114 may be substantially the same as the thickness of the rigid structure 112.

That is, the flexible display apparatus 100 may include a flexible display panel 120 including the display area AA and the non-display area NA and a backplate structure 110 supporting the flexible display panel 120, and including a rigid structure 112 fixed by an elastic structure 114 wherein the elastic structure 114 is configured to have flexibility and elasticity.

According to above configuration, there is an effect that the backplate structure 110 can support the flexible display panel 120 and can have flexibility and stretchability at the same time by a rigid structure 112 having a plurality of island patterns spaced apart from each other by a predetermined distance and an elastic structure 114 configured to fill a specific space of the rigid structure 112. In addition, since the rigid structure 112 is formed of a plurality of island patterns and the respective island patterns are not connected to each other, even when the rigid structure 112 is fixed by the elastic structure 114, there is an effect that the elasticity of the elastic structure 114 is not substantially reduced. Therefore, there is an effect that the elasticity of the elastic structure 114 can be maintained.

In addition, since the elastic structure 114 fixes the rigid structure 112, the rigidity of the flexible display apparatus 100 can be improved by the rigid structure 112. That is, the elastic structure 114 may be configured to hold a plurality of island pattern of the rigid structures 112 spaced apart from each other. In other words, the elastic structure 114 includes a plurality of opening areas, and the rigid structure 112 can be fixed to the plurality of opening areas of the elastic structure 114. That is, the rigid structure 112 may be disposed in the plurality of openings of the elastic structure 114 such that the rigid structure 112 is in contact with the elastic structure 114.

The flexible display apparatus 100 may include a flexible display panel 120 including a plurality of pixels including an electroluminescence element, a plurality of patterns arranged on the back surface of the flexible display panel 120 and having a long axis in the first direction and made of a rigid material, and an elastic structure 114 disposed on the back surface of the flexible display panel 120 for fixing a plurality of patterns each having a long axis in the first direction and made of a rigid material. Here, the plurality of patterns made of the rigid material may referred to the rigid structure 112. That is, the rigidity of the backplate structure 110 may be relatively higher in the first direction than in the second direction perpendicular to the first direction and the stretchability of the backplate structure 110 may be relatively higher in the second direction than in the first direction.

In other words, there is an effect that even if stress is applied to the flexible display apparatus 100, the elastic structure 114 of the backplate structure 110 is flexibly deformed, so that the stress applied to the flexible display panel 120 can be reduced. For example, when the backplate structure 110 and the flexible display panel 120 are folded or rolled-up, the backplate structure 110 may be stretched in the direction in which a tensile force is applied to the elastic structure 114, and the length of the backplate structure 110 can be flexibly increased. In addition, since the patterns of the rigid structure 112 are not connected to each other, there is an effect that the elastic structure 114 is not restricted from stretching. Therefore, when compared to the case where the patterns of the rigid structure are connected to each other, there is an effect that the stretchability of the backplate structure 110 according to the embodiment of the present disclosure can be relatively better.

The material forming the elastic structure 114 may be configured to have an adhesive force. Thus, the backplate structure 110 can be attached to the flexible display panel 120 by the elastic structure 114. But it is also possible that an adhesive layer is further provided between the backplate structure 110 and the flexible display panel 120.

In some embodiments, the flexible film may be electrically connected to the flexible display panel 120. The flexible film is a film on which various elements are arranged in a flexible base film, and is a film for supplying signals to a plurality of pixels and circuit units in the display area AA. The flexible film is disposed at one end of the non-display area NA of the flexible display panel 120 to supply a power supply voltage, a data voltage, and the like to a plurality of pixels and a circuit unit of the display area AA. A drive IC such as a gate driver IC or a data driver IC may be disposed on the flexible film. For example, the drive IC is a unit for processing a data signal for displaying an image and a drive signal for processing the data signal. Such driver ICs can be arranged in a manner such as a chip on glass (COG), a chip on film (COF), a tape carrier package (TCP) or the like according to a mounting method. However, the present disclosure is not limited to the chip on film type in which the driver IC is mounted on a flexible film as described above merely for convenience of explanation.

In some embodiments, the printed circuit board may be disposed at one end of the flexible film and connected to the flexible film. The printed circuit board is an element that supplies a signal to the driver IC. The printed circuit board supplies various signals such as a driving signal, a data signal, and the like to the driver IC. Various elements can be disposed on the substrate of the printed circuit board. For example, a timing controller, a power supply unit, and the like may be disposed on the printed circuit board substrate.

In some embodiments, additional printed circuit board substrates that are connected to the printed circuit board substrate may be further disposed. For example, the printed circuit board substrate may be referred to as a source PCB (S-PCB) on which the data driver IC is mounted, and the additional printed circuit board substrate connected to the printed circuit board substrate may be referred to as a control printed circuit board substrate and may be referred to as a control PCB (C-PCB).

Figure 4:
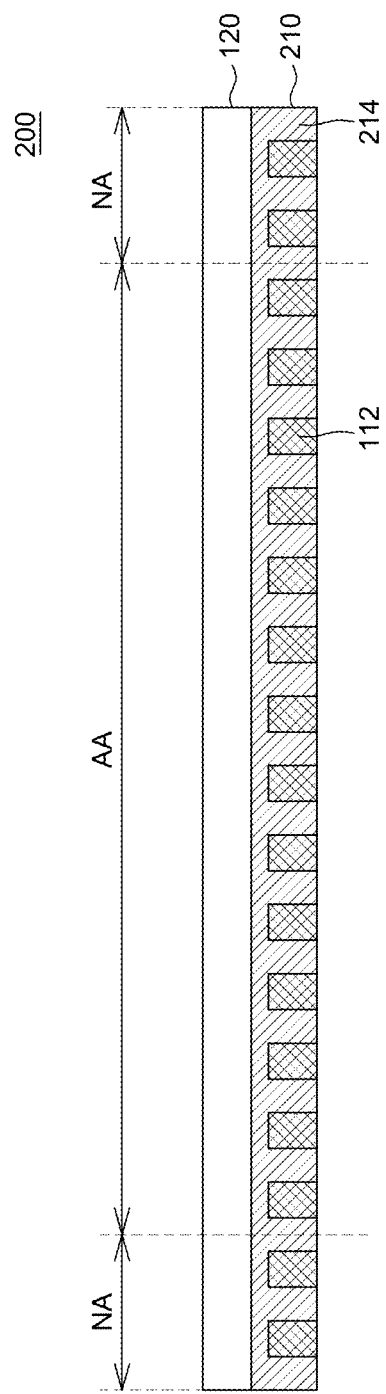
FIG. 4 is a cross-sectional view of a display apparatus according to another embodiment of the present disclosure.

FIG. 4 is a cross-sectional view of a display apparatus according to another embodiment of the present disclosure.

Since the flexible display apparatus 200 according to another embodiment of the present disclosure and the flexible display apparatus 100 according to an embodiment of the present disclosure are substantially similar except for the backplate structure. Thus, redundant descriptions may be omitted merely for convenience of explanation.

The flexible display apparatus 200 according to another embodiment of the present disclosure can cover the side surface and the upper surface of the rigid structure 112 with the elastic structure 214 of the backplate structure 210. That is, the elastic structure 214 may be configured to cover the side surface and the upper surface of the plurality of patterns of the rigid structure 112. The thickness of the elastic structure 214 may be thicker than the plurality of patterns of the rigid structure 112.

According to above configuration, there are effects that as the elastic structure 214 is disposed between the rigid structure 112 and the flexible display panel 120 and the rigid structure 112 includes a plurality of island patterns spaced apart from each other, thereby ensuring rigidity of the rigid structure 112 in the long axis of the island patterns and absorbing the impact that may be generated by the rigid structure 112 by the elastic structure 214 for protecting the flexible display panel 120. Further, the contact area of the elastic structure 214 can be increased such that the adhesive force can be improved.

In addition, the elastic structure 214 has an effect of suppressing scratches on the flexible display panel 120 due to the rigid structure 112.

In some embodiments, the elastic structure 214 may comprise a black material. For example, the backplate structure 210 disposed under the flexible display panel 120 can be observed by the user when watching the image of the flexible display panel 120 by the user. However, when the elastic structure 214 includes a black material, there is an effect that the backplate structure 210 cannot be observed by the user by the elastic structure 214.

Figure 5:
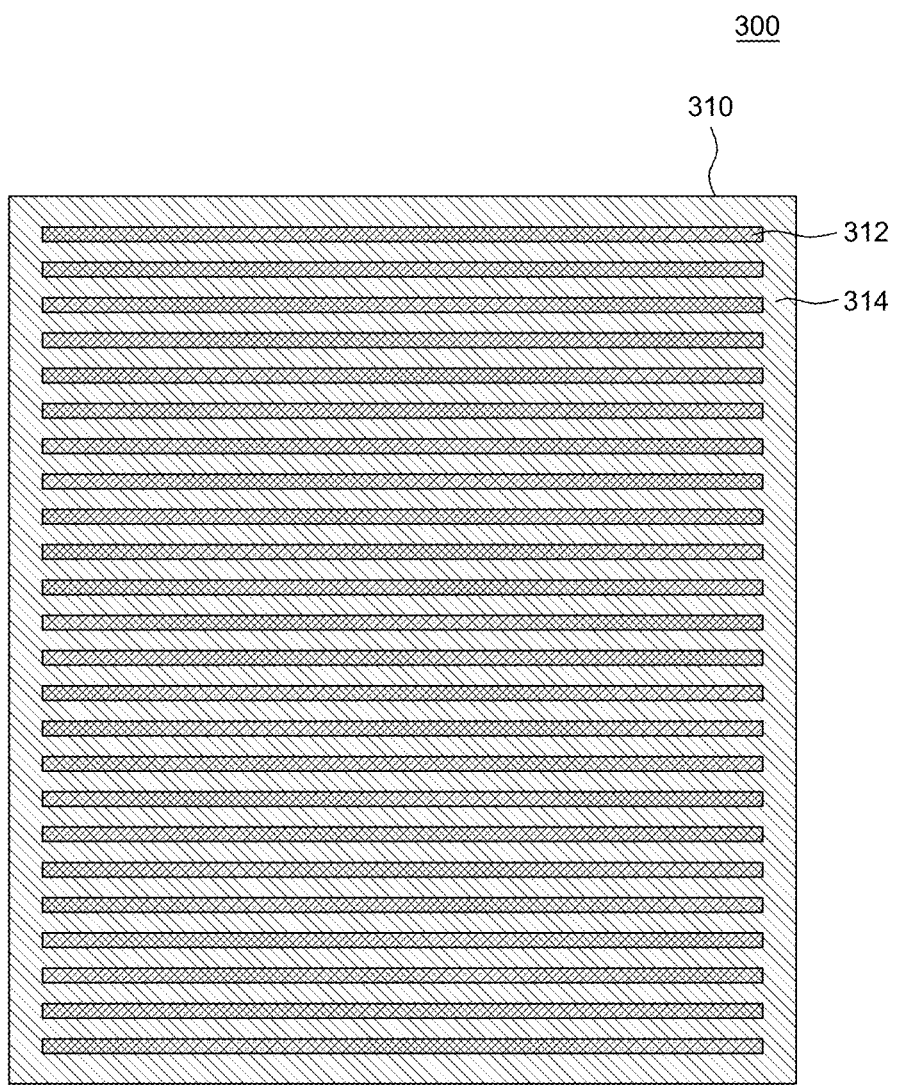
FIG. 5 is a plan view showing a display apparatus according to the other embodiment of the present disclosure, viewed from the back side.

FIG. 5 is a plan view showing a display apparatus according to the other embodiment of the present disclosure, viewed from the back side.

Since the flexible display apparatus 300 according to the other embodiment of the present disclosure and the flexible display apparatus 100 according to an embodiment of the present disclosure are substantially similar except for the backplate structure. Thus, redundant descriptions may be omitted merely for convenience of explanation.

The flexible display apparatus 300 according to the other embodiment of the present disclosure may include a rigid structure 312 of the backplate structure 310 including a plurality of bar shapes extending in the first direction and spaced apart from each other by a predetermined distance. Further, the elastic structure 314 may be configured to support the bar shaped rigid structure 312.

According to the above-described configuration, the rigid structure 312 has an effect such that excellent rigidity can be provided in the first direction. Further, an excellent flexibility can be provided in the second direction perpendicular to the first direction. In addition, since the elastic structure 314 can hold each of the plurality of bar shaped rigid structures 312, there is an effect that even if each of the rigid structures 312 is arranged of an island pattern, each island pattern can be maintained with a specific interval.

Figure 6:
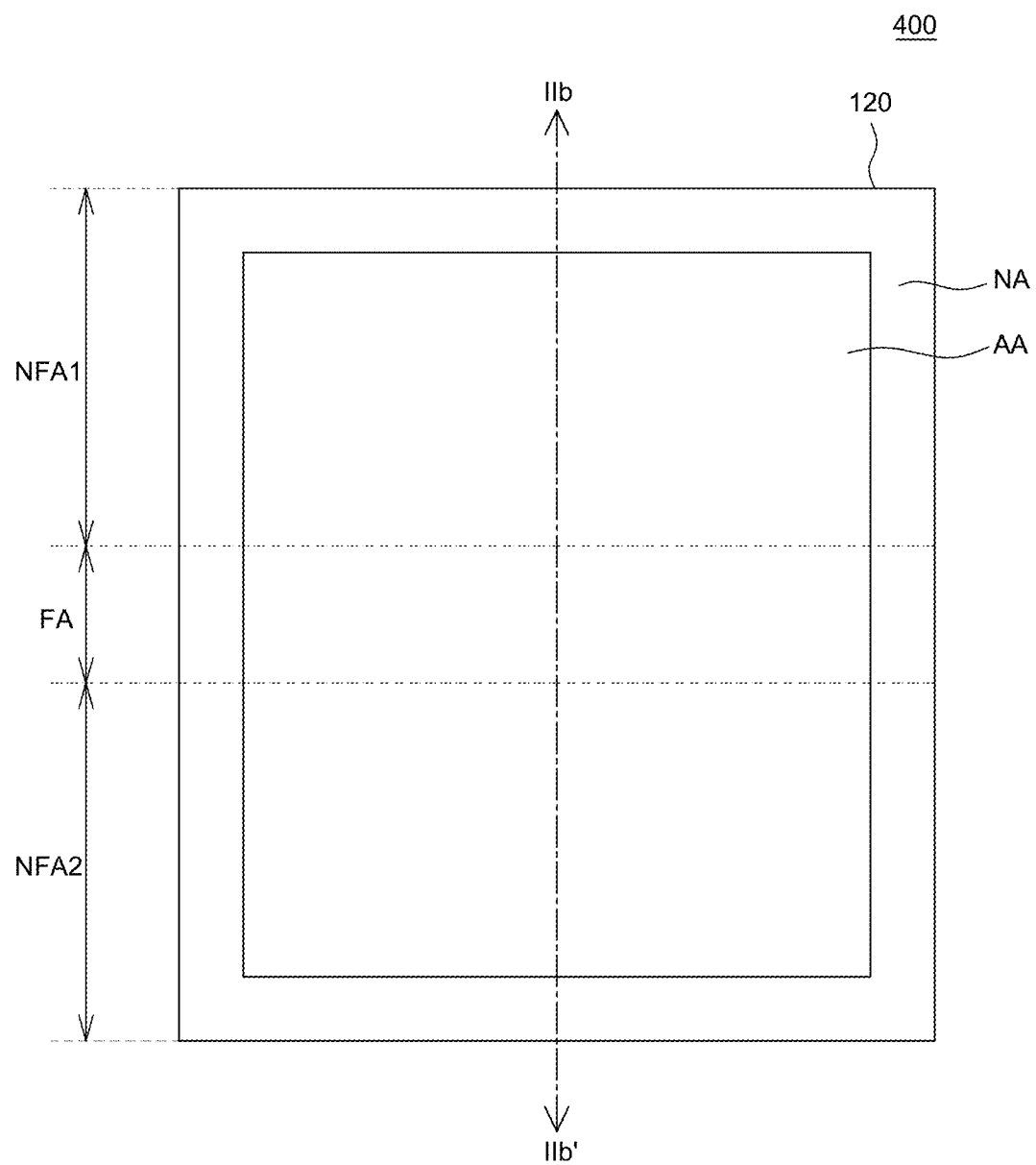
FIG. 6 is a plan view showing a display apparatus according to the other embodiment of the present disclosure from the front side.

FIG. 6 is a plan view showing a display apparatus according to the other embodiment of the present disclosure from the front side.

Figure 7:
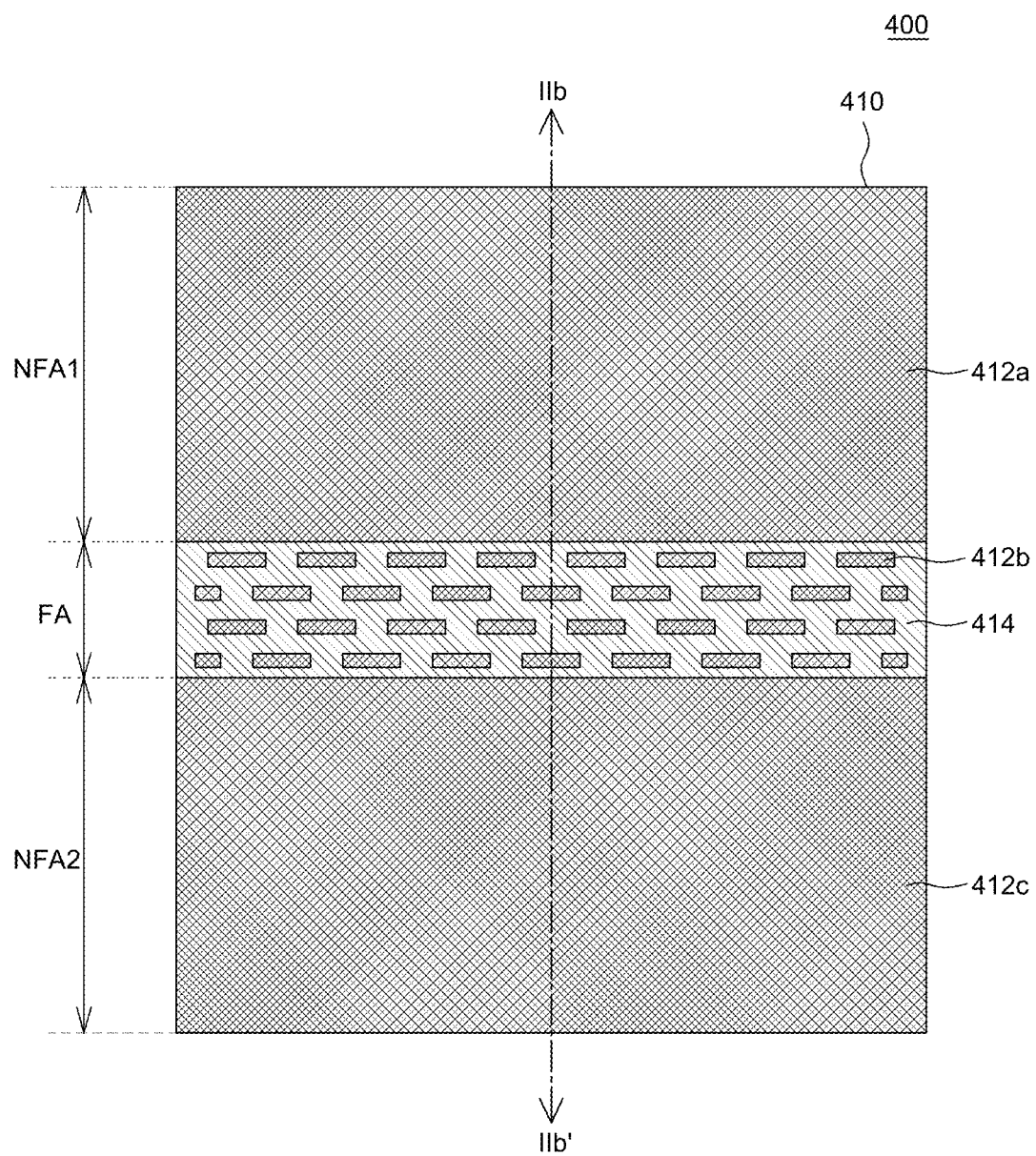
FIG. 7 is a plan view showing a display apparatus according to the other embodiment of the present disclosure, viewed from the back side.

FIG. 7 is a plan view showing a display apparatus according to the other embodiment of the present disclosure, viewed from the back side.

Figure 8:
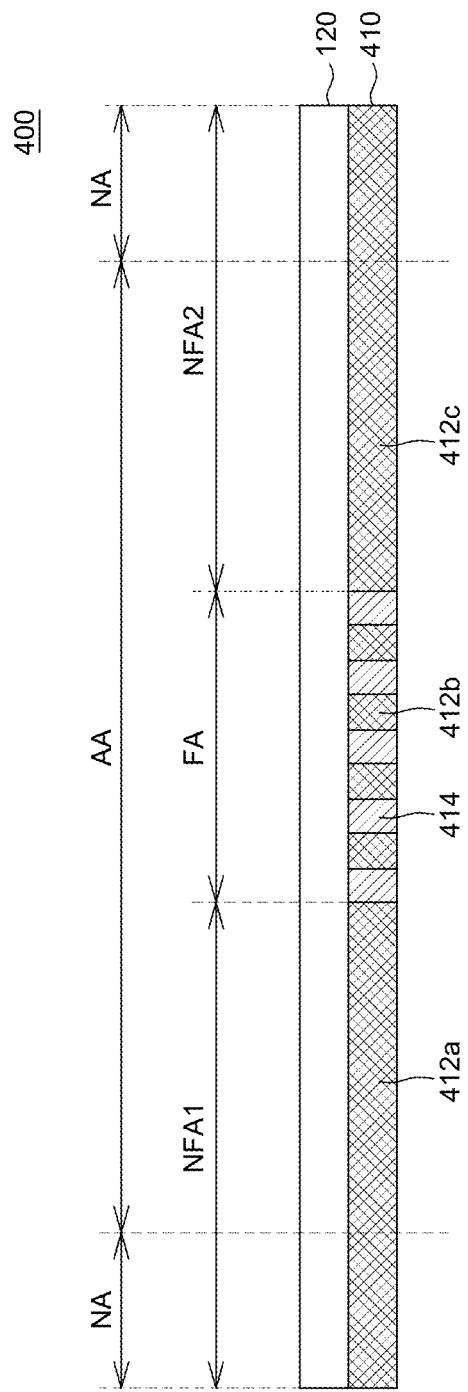
FIG. 8 is a cross-sectional view taken along line IIb-IIb' of FIG. 6 according to an embodiment of the present disclosure.

FIG. 8 is a cross-sectional view taken along line IIb-IIb' of FIG. 6.

Since the flexible display apparatus 400 according to the other embodiment of the present disclosure and the flexible display apparatus 100 according to an embodiment of the present disclosure are substantially similar except for the backplate structure. Thus, redundant descriptions may be omitted merely for convenience of explanation.

The flexible display apparatus 400 is configured to include a folding area FA and non-folding areas NFA1 and NFA2. The non-folding areas NFA1 and NFA2 are configured to include at least a first non-folding area NFA1 and a second non-folding area NFA2 respectively.

The folding area FA is an area where the display panel 120 is folded, and includes a portion of the display area AA and the non-display area NA.

The non-folding areas NFA1 and NFA2 are areas where the flexible display apparatus 400 maintains a flat state. The non-folding areas NFA1 and NFA2 may be supported by a planar rigid material made of the same material as the plurality of patterns.

The non-folding areas NFA1 and NFA2 include a first non-folding area NFA1 and a second non-folding area NFA2. Each of the first non-folding area NFA1 and the second non-folding area NFA2 may be configured to include another part of the display area AA and the non-display area NA.

The first non-folding area NFA1 and the second non-folding area NFA2 may be disposed on both sides of the folding area FA. That is, the first non-folding area NFA1 and the second non-folding area NFA2 can be defined with the folding area FA interposed therebetween. Further, when the flexible display apparatus 400 is folded, the first non-folding area NFA1 and the second non-folding area NFA2 may be arranged to face each other.

Each of the plurality of patterns of the rigid structure 412b of the folding area FA may extend so as to be parallel to the folding axis. Here, the folding axis may be a direction in which the folding area FA extends in FIG. 6. That is, it may be the horizontal direction as shown in FIG. 6.

Backplate structure 410 may be configured to include the rigid structures 412a and 412c disposed in non-folding areas NFA1 and NFA2 and the rigid structure 412b and the elastic structure 414 disposed in folding area FA. According to above-described configuration, the flatness of the non-folding areas NFA1 and NFA2 can be maintained by the rigidity of the non-folding areas NFA1 and NFA2 due to the rigid structures 412a and 412c disposed under the back side of the non-folding areas NFA1 and NFA2.

The folding can be facilitated by the rigid structure 412b and the elastic structure 414 disposed in the folding area FA.

In some embodiments, the elastic structure may be configured to cover both the folding area FA and the non-folding areas NFA1 and NFA2.

Figure 9:
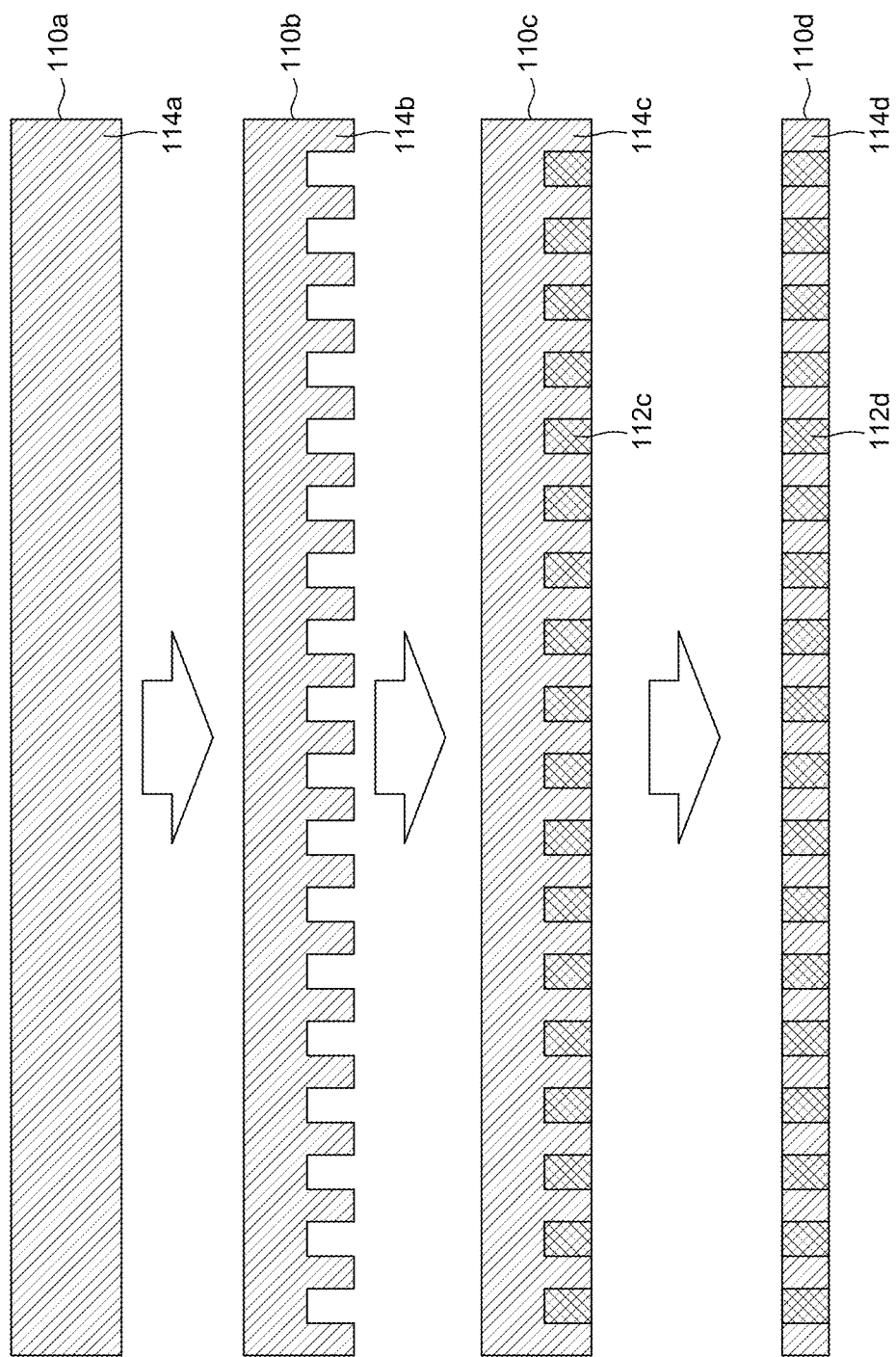
FIG. 9 is a flowchart illustrating a method of manufacturing a backplate structure of a display apparatus according to an embodiment of the present disclosure.

FIG. 9 is a flowchart illustrating a method of manufacturing a backplate structure of a display apparatus according to an embodiment of the present disclosure.

In order to manufacture the backplate structure 110 of the display apparatus 100 according to an embodiment of the present disclosure, at least four stages of the manufacturing process may be performed.

First, the backplate structure 110a in the first manufacturing step may be a rigid substrate 114a on which no pattern is formed.

Then, the first surface of the rigid substrate 114b of the backplate structure 110b in the second manufacturing step is etched to create a plurality of openings on the first surface. The etched shape may correspond to the shape of the elastic structure.

Then, the resin 112c for elastic structure is applied to the plurality of openings in the etching region of the rigid substrate 114c of the backplate structure 110c in the third step. The applied resin 112c fills the openings in the etched area. For example, the resin 112c can be applied using a screen printing method or an ink jet method.

The flexible display apparatus 100 manufactured by the manufacturing method described above may include a flexible display panel 120 configured to display an image, and a backplate structure comprising an elastic structure 112d disposed under the back surface of the flexible display panel 120 and having elasticity and including a plurality of opening patterns and a rigid structure 114d disposed so as to correspond to the plurality of opening patterns of the elastic structure 112d.

Although the embodiments of the present disclosure have been described in detail with reference to the accompanying drawings, it is to be understood that the present disclosure is not limited to those embodiments and various changes and modifications may be made without departing from the scope of the present disclosure. Therefore, the embodiments disclosed in the present disclosure are intended to illustrate rather than limit the scope of the present disclosure, and the scope of the technical idea of the present disclosure is not limited by these embodiments. Therefore, it should be understood that the above-described embodiments are illustrative in all aspects and not restrictive. The scope of the present disclosure should be construed according to the claims, and all technical ideas within the scope of equivalents should be construed as falling within the scope of the present disclosure.

What is claimed is:

1. A flexible display apparatus including:
a flexible display panel including a display area and a non-display area; and
a backplate structure on the flexible display panel such that the backplate structure overlaps at least the display area, the backplate structure including an elastic structure and a rigid structure disposed in the elastic structure, the elastic structure more flexible than the rigid structure,
wherein the rigid structure comprises a plurality of island patterns, each of the plurality of island patterns spaced apart from another one of the plurality of island patterns.

2. The flexible display apparatus of claim 1, wherein the elastic structure comprises a viscoelastic material.

3. The flexible display apparatus of claim 2, wherein a Young's modulus of the viscoelastic material is between $10^4$ Pa and $10^6$ Pa.

4. The flexible display apparatus of claim 1, wherein the elastic structure is in contact with the plurality of island patterns.

5. The flexible display apparatus of claim 1, wherein each of the plurality of island patterns comprises a shape from one of a point shape, a rod shape, an elliptical shape, a ribbon shape, a dumbbell shape, a round shape, a rectangular shape, a rhombic shape, or a polygonal shape.

6. The flexible display apparatus of claim 1, wherein the elastic structure includes a plurality of opening areas, and the rigid structure is disposed within the plurality of opening areas of the elastic structure.

7. A flexible display apparatus including:
a flexible display panel including a plurality of pixels, each of the plurality of pixels comprising an electroluminescence element;
an elastic structure disposed on a back surface of the flexible display panel; and
a plurality of patterns disposed in the elastic structure, the plurality of patterns having a length along a first direction; and
wherein the plurality of patterns is more rigid than the elastic structure.

8. The flexible display apparatus of claim 7,
wherein the flexible display panel includes a folding area and a non-folding area, and
wherein the plurality of patterns is disposed in the folding area without being disposed in the non-folding area.

9. The flexible display apparatus of claim 7, wherein the elastic structure covers a first surface and a second surface of each of the plurality of patterns, the second surface closer to the flexible display panel than the first surface.

10. The flexible display apparatus of claim 7, wherein each of the plurality of patterns extends along the first direction, the first direction parallel to a folding axis across which the flexible display apparatus is folded.

11. The flexible display apparatus of claim 7, wherein a thickness of the elastic structure is thicker than a thickness of the plurality of patterns.

12. The flexible display apparatus of claim 7, wherein each of the plurality of patterns is spaced apart from another one of the plurality of patterns at a specific interval.

13. The flexible display apparatus of claim 8, wherein the non-folding area is supported by a planar material made of a same material of the plurality of patterns.

14. A flexible display apparatus including:
a flexible display panel configured to display an image; and
a backplate structure on a rear surface of the flexible display panel, the backplate structure including a rigid structure and an elastic structure, the elastic structure having a plurality of openings and the rigid structure disposed within the plurality of openings;
wherein the elastic structure is more flexible than the rigid structure.

15. The flexible display apparatus of claim 14, wherein the flexible display panel includes an electroluminescence element.

16. The flexible display apparatus of claim 14, wherein a rigidity of the backplate structure along a first direction is greater than a rigidity of the backplate structure along a second direction that is perpendicular to the first direction.

17. The flexible display apparatus of claim 16, wherein a stretchability of the backplate structure along the second direction is greater than a stretchability of the backplate structure along the first direction.

18. The flexible display apparatus of claim 14, wherein the elastic structure comprises a mesh pattern.

19. The flexible display apparatus of claim 18, wherein a portion of the elastic structure is disposed between the flexible display panel and the rigid structure.

* * * * *